(12) United States Patent
Yamamoto

(10) Patent No.: US 7,053,572 B2
(45) Date of Patent: May 30, 2006

(54) LIMITING CIRCUIT AND ELECTRIC MOTOR DRIVING DEVICE USING THE SAME

(75) Inventor: Seiichi Yamamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 83 days.

(21) Appl. No.: 10/764,404

(22) Filed: Jan. 23, 2004

(65) Prior Publication Data

US 2004/0155618 A1     Aug. 12, 2004

(30) Foreign Application Priority Data

Feb. 4, 2003    (JP)    .............. 2003-026835

(51) Int. Cl.
*H02P 7/00*    (2006.01)

(52) U.S. Cl. .............. 318/432; 318/599; 318/811; 318/434; 361/93.1; 361/93.9

(58) Field of Classification Search ........ 318/432–434, 318/138, 254, 439, 700, 701, 705, 599, 811; 361/93.1, 93.9, 23, 24

See application file for complete search history.

(56) References Cited

U.S. PATENT DOCUMENTS

| | | | | |
|---|---|---|---|---|
| 3,649,897 A | * | 3/1972 | Messick | 318/434 |
| 5,212,630 A | * | 5/1993 | Yamamoto et al. | 363/71 |
| 5,264,781 A | * | 11/1993 | Miller et al. | 323/282 |
| 5,449,986 A | * | 9/1995 | Dozor | 318/254 |
| RE35,124 E | * | 12/1995 | Erdman et al. | 318/599 |
| 5,705,909 A | * | 1/1998 | Rajashekara | 318/801 |
| 5,912,542 A | * | 6/1999 | Zalesski | 318/701 |
| 6,873,130 B1 | * | 3/2005 | Janisiewicz et al. | 318/701 |

FOREIGN PATENT DOCUMENTS

JP    2002-84772    3/2002

* cited by examiner

*Primary Examiner*—Rina Duda
(74) *Attorney, Agent, or Firm*—Hamre, Schumann, Mueller & Larson, P.C.

(57) ABSTRACT

An input signal Va is compared with a limitation signal Vlim. When the input signal Va exceeds the limitation signal Vlim, an excess (Va−Vlim) is obtained as an excess signal Vext. In a signal output circuit 60, the excess signal Vext is subtracted from the input signal Va and an output signal Vo is sent.

7 Claims, 7 Drawing Sheets

LIMITING CIRCUIT AND ELECTRIC MOTOR DRIVING DEVICE USING THE SAME

BACKGROUND OF THE INVENTION

1. Field of the Invention

The present invention relates to a limiting circuit for limiting a voltage or current to be input with a predetermined value, and an electric motor driving device for efficiently driving an electric motor by using the limiting circuit.

2. Description of the Related Art

Conventionally, a spindle motor has been used for driving a disc such as a CD (Compact Disk) or a DVD (Digital Video Disk).

FIG. 8 is a diagram showing the structure of a driving device for a three-phase brushless electric motor M to be used for the conventional driving operation, which has been described in JP 2002-84772. In the conventional example, the electric motor M is constituted by a permanent magnet rotor, and a stator in which armature coils having three phases of a U phase, a V phase and a W phase are provided on a circumference and a rotor position detector for each phase is provided in the position of the armature coil having its respective phase. A rotor position detector 11 for each phase is representatively shown on the outside of the electric motor M.

In FIG. 8, a transistor switch for each phase is constituted by P-type MOS transistors QUH, QVH and QWH on a positive electrode side and N-type MOS transistors QUL, QVL and QWL on a negative electrode side, and they are ON/OFF controlled in accordance with a gate control signal respectively.

The rotor position detector 11 is constituted by a Hall device, for example, and outputs six types of sine wave signals including output signals on positive and negative electrodes in U, V and W phases, where a phase difference in the output signal in each phase is 120 degrees (=360 degrees/3).

A position detector/phase shifting circuit 14 takes a difference between the output signals on the positive and negative electrodes for each phase in signals HU, HV and HW output from the rotor position detector 11, and removes an in-phase noise component superposed on a signal line, obtains mutual difference signals of the output signals HU, HV and HW and outputs the phase-shifting signals HU1, HV1 and HW1, having a phase difference Δθ of 30 degrees, for example.

The phase-shifting signals HU1, HV1 and HW1 are mainly formed for the following reason. More specifically, a lag corresponding to a time constant is generated by the inductance component of the armature of the electric motor M before a voltage is applied to the armature and a current actually flows out upon receipt of a signal sent from the rotor position detector 11, and the commutation time of the current flowing to the armature is later than a normal commutation timing so that an electric motor driving efficiency is deteriorated or a torque unevenness is increased. Therefore, such a situation shall be prevented from being caused.

An oscillator 13A includes a triangular wave generating circuit constituted by an operational amplifier, a constant current source and a capacitor, and generates a triangular-wave high-frequency reference signal OSC having an audio frequency band (16 kHz) or more, for example, and outputs the same signal OSC to a comparator 16A.

The comparator 16A receives the phase-shifting signals HU1, HV1 and HW1 and the triangular-wave oscillating signal OSC sent from the oscillator 13A and compares them with each other, and outputs PWM signals UPWM, VPWM and WPWM from a difference between both of the signals.

Pre-driving circuits 17AU, 17AV and 17AW for each phase receive the PWM signals UPWM, VPWM and WPWM sent from the comparator 16A every phase. Gate control signals VUGH to VWGL are formed by the PWM signals UPWM to WPWM, and are supplied to P-type MOS transistors QUH, QVH and QWH on the positive electrode side and N-type MOS transistors QUL, QVL and QWL on the negative electrode side.

A torque command circuit 12 serves to output a control command in such a manner that the rotating speed of the electric motor M has a predetermined value, and to compare a set value Vs of the rotating speed with a measured value Vdet of an actual rotating speed and to control the amplitudes of the displacement signals HU1, HV1 and HW1 corresponding to a deviation thereof.

In the structure described above, the measured value Vdet which is proportional to the actual rotating speed of the electric motor M is detected. For example, when the speed of the electric motor M is higher than the predetermined set value Vs, a control signal corresponding to a deviation thereof is output to the position detector/phase-shifting circuit 14 to reduce the amplitudes of the displacement signals HU1, HV1 and HW1.

By the reduction in the amplitudes of the displacement signals HU1, HV1 and HW1, the pulse width of an ON/OFF duty in the PWM signals UPWM, VPWM and WPWM sent from the comparator 16A is shortened, a current flowing to the electric motor M is decreased through transistor switches QUH to QWL for the U, V and W phases to decelerate the electric motor M. Also in the case in which the rotating speed is low, similarly, the current flowing to the electric motor M is increased to accelerate the electric motor M. Thus, the speed of the electric motor M is controlled.

However, when the three-phase brushless electric motor M is to be driven at the highest rotating speed, for example, the set value Vs (that is, a reference voltage) is increased in order to obtain a large torque. When the rotating speed of the electric motor M is increased, the rotating electromotive voltage of the electric motor M is raised so that a driving current flowing to the electric motor M is decreased. Consequently, such a control as to raise a voltage applied to the electric motor M is carried out. When the applied voltage is excessively raised, a driving current waveform is distorted by the influence of the rotating electromotive voltage and the applied voltage so that a driving efficiency is deteriorated. Moreover, the electric motor M cannot be driven with a sine wave-shaped current. Consequently, there is also a problem in that a noise is increased with the driving operation of the electric motor M.

SUMMARY OF THE INVENTION

Therefore, it is an object of the invention to provide an electric motor driving device capable of causing the waveform distortion of a driving current with difficulty and reducing a noise even in a case such that an input voltage corresponding to a torque is high.

Moreover, it is an object of the invention to provide a limiting circuit which is rarely influenced by a variation in a circuit element or a temperature characteristic and can limit an input signal to have a predetermined value.

A first aspect of the invention is directed to a limiting circuit comprising an excess signal circuit 40 for inputting an input signal Va and a limitation signal Vlim, and comparing them with each other and outputting an excess (Va−Vlim) as an excess signal Vext when the input signal Va exceeds the limitation signal Vlim, and a signal output circuit 60 for inputting the input signal Va and the excess signal Vext, subtracting the excess signal Vext from the input signal Va and outputting an output signal Vo.

A second aspect of the invention is directed to the limiting circuit according to the first aspect of the invention, further comprising a limitation signal circuit 20 having such a structure that a constant current source 21 and a resistor 22 are connected in series and a voltage on a serial node is fetched as the limitation signal Vlim through a buffer 23.

A third aspect of the invention is directed to the limiting circuit according to the second aspect of the invention, wherein the excess signal circuit 40 has such a structure that a transistor 41 to which the input signal Va is supplied as a control signal and a resistor 42 are connected in series, a first current I1 corresponding to the input signal Va flows, a voltage on a node of the transistor 41 and the resistor 42 is set to be a comparison voltage Vb, and a second current I2 corresponding to an excess flows when the comparison voltage Vb exceeds an output voltage Vlim of the buffer 23, and the signal output circuit 60 outputs, as the output signal Vo, a third current Io corresponding to a difference between the first current I1 and the second current I2.

A fourth aspect of the invention is directed to the limiting circuit according to the first aspect of the invention, further comprising a limitation signal circuit 20 having such a structure that a constant current source 31 and a resistor 32 are connected in series and a voltage on a serial node is fetched as the limitation signal Vlim.

A fifth aspect of the invention is directed to the limiting circuit according to the fourth aspect of the invention, wherein the excess signal circuit 40A has such a structure that a transistor 51 to which the input signal Va is supplied as a control signal and a resistor 52 are connected in series, a first current I1 corresponding to the input signal Va flows, a voltage Vb on a node of the transistor 51 and the resistor 52 is set to be a comparison voltage and is differentially amplified with the limitation signal Vlim, and a second current I2 corresponding to an excess flows when the comparison voltage Vb exceeds the limitation signal Vlim, and the signal output circuit 60A outputs, as the output signal Vo, a third current Io corresponding to a difference between the first current I1 and the second current I2.

A sixth aspect of the invention is directed to an electric motor driving device comprising an error amplifier 110 for generating an error output signal Va depending on a difference between a reference signal Vref and a current detection signal Vin corresponding to a current flowing to an electric motor, a limiting circuit 200 for inputting the error output signal Va, limiting a value to be a predetermined value, and outputting a limitation error output signal, and a driving circuit for PWM driving the electric motor based on the limitation error output signal and a signal corresponding to a sine wave-shaped rotating position signal of the electric motor.

A seventh aspect of the invention is directed to the electric motor driving device according to the sixth aspect of the invention, wherein the driving circuit has multipliers 120U to 120W for multiplying the limitation error output signal by the sine wave-shaped rotating position signal of the electric motor and outputting a PWM command signal, a PWM converting block 140 for forming a PWM control signal based on the PWM command signal, and a driving stage block 150 for outputting an electric motor driving current based on the PWM control signal.

An eighth aspect of the invention is directed to the electric motor driving device according to the sixth aspect of the invention, wherein the limiting circuit 200 according to any of the first to fifth aspects of the invention is used.

DESCRIPTION OF THE PREFERRED EMBODIMENTS

An embodiment of an electric motor driving device and a limiting circuit according to the invention will be described below with reference to the drawings.

Figure 1:
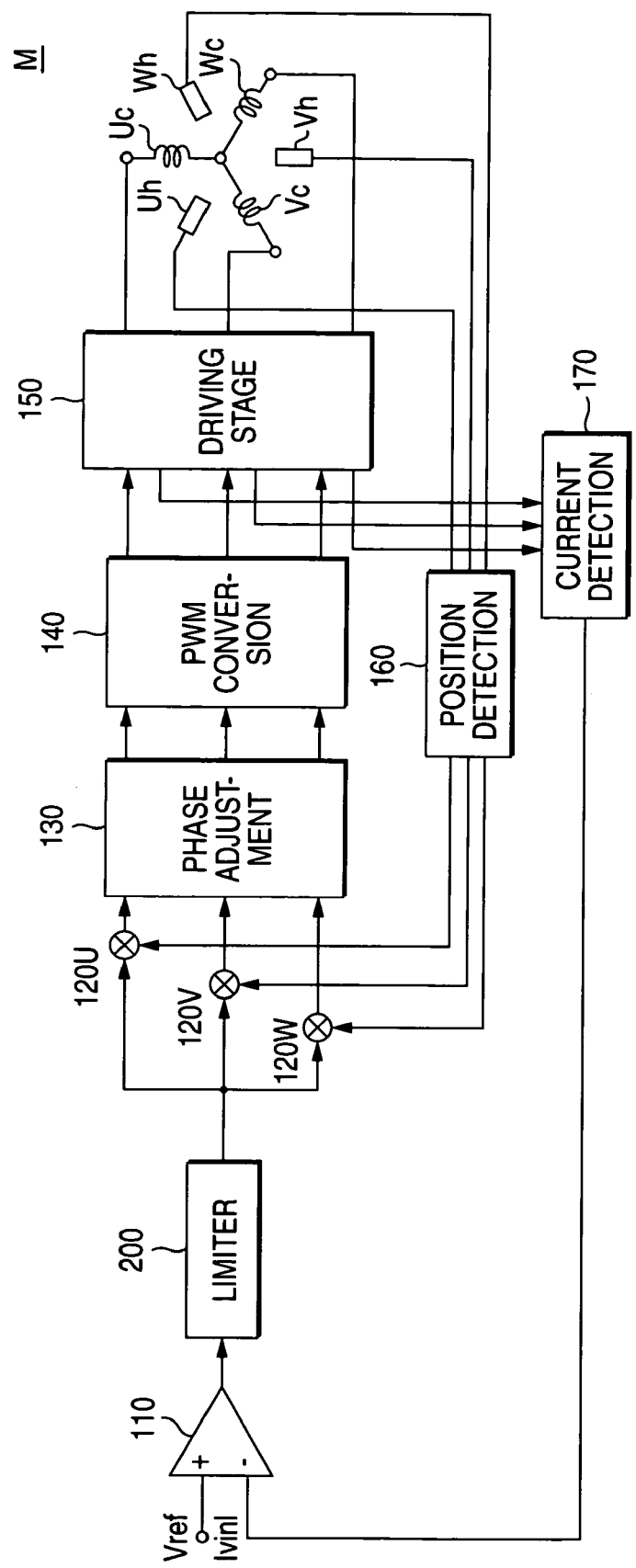
FIG. 1 is a diagram showing the structure of a driving device for a three-phase brushless electric motor according to an embodiment of the invention.

FIG. 1 is a diagram showing the structure of the driving device of a three-phase brushless electric motor M according to the embodiment of the invention.

In FIG. 1, an error amplifier 110 inputs a reference voltage Vref to be a set value and a detection voltage |Vin| indicative of the current value of the electric motor M, and generates an error output signal corresponding to a difference thereof.

Multipliers 120U, 120V and 120W multiply the error output signal sent from the error amplifier 110 by sign wave-shaped position detection signals having U, V and W phases which are sent from a position detecting block 160, thereby forming a command signal for pulse width modulation (PWM). The command signal for PWM is phase-adjusted by a phase adjusting block 130 and is then supplied to a PWM converting block 140. In the PWM converting block 140, a PWM pulse signal is formed based on the PWM command signal thus phase-adjusted and is supplied to a driving stage block 150.

In the driving stage block 150, internal output switches are ON/OFF controlled based on the PWM pulse signal to carry electricity to driving coils Uc, Vc and Wc having the U, V and W phases of the electric motor M. The electric motor M is rotated at a speed corresponding to the current switching frequency of a current flowing to the driving coils Uc, Vc and Wc and rotated with a torque corresponding to the current value thereof.

The rotating state of the electric motor M is detected by position detecting elements (Hall devices) Uh, Vh and Wh corresponding to three phases which are provided in the electric motor M. The outputs of the Hall devices Uh, Vh and Wh are sent as sine wave-shaped position signals and are supplied to the multipliers 120U, 120V and 120W.

Moreover, the current value of the electric motor M is detected by a current detecting block 170, and supplies the detection voltage |Vin| indicative of the current to the error amplifier 110. A detection voltage indicative of the current is a power current supplied to the electric motor M.

In FIG. 1, furthermore, a limiting circuit (hereinafter referred to as a limiter) 200 is provided between the error amplifier 110 and the multipliers 120U to 120W.

Since the limiter 200 is provided, an error output signal sent from the error amplifier 110 is limited to have a predetermined limit value and is thus output when the error output signal is large. Even if the error output signal is large, a signal exceeding the limit value of the limiter 200 is not supplied to the multipliers 120U to 120W. Therefore, the PWM command signal is also limited to have a predetermined value. For example, the limit value of the limiter 200 can be set in such a manner that the PWM command signal is supplied to the phase adjusting block 130 with the shape of a sine wave maintained in the same manner as a sine wave-shaped position signal.

Also in the case in which a difference between the reference signal Vref and the detection voltage |Vin| is large, accordingly, a voltage to be applied to the electric motor M can be prevented from being increased excessively and the distortion of a driving current waveform can be avoided beforehand. Consequently, it is possible to prevent a driving efficiency from being deteriorated. Moreover, the driving operation of the electric motor M at a sine wave-shaped current can be maintained. Consequently, it is possible to prevent a noise from being generated by the driving operation of the electric motor M.

Figure 2:
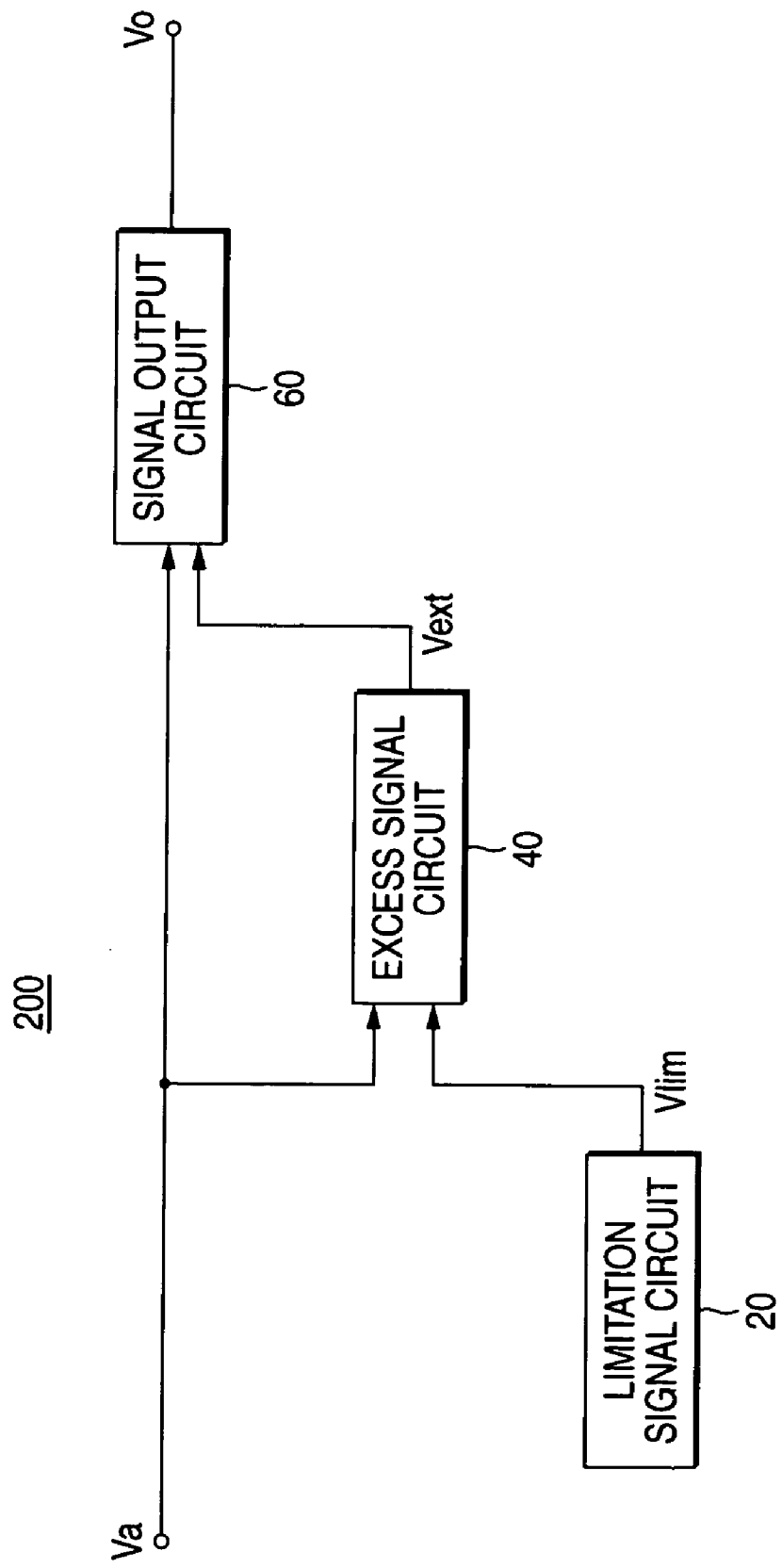
FIG. 2 is a block diagram showing the structure of a limiting circuit according to the embodiment of the invention.
Figure 3:
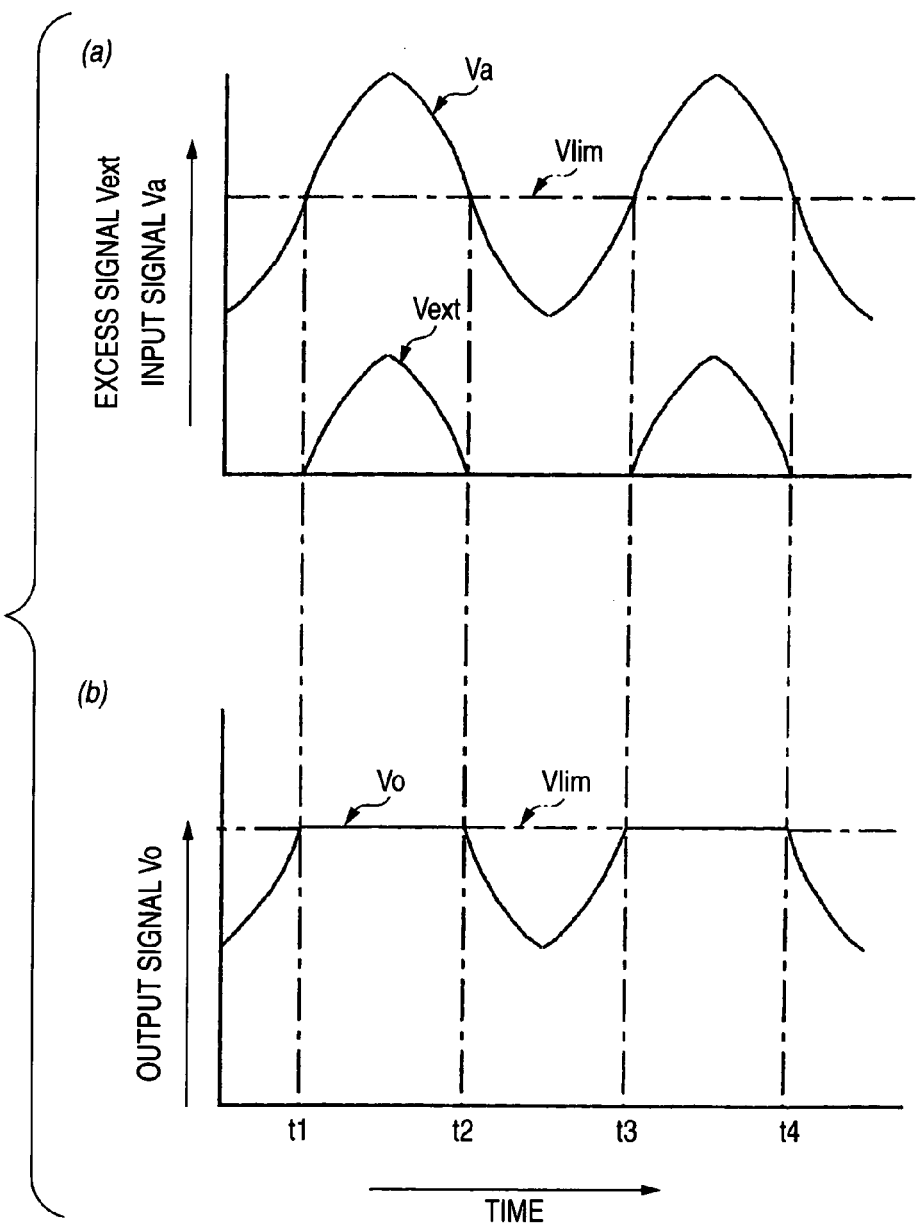
FIGS. 3(a) and 3(b) show the charts for explaining an operation in FIG. 2.

FIG. 2 is a block diagram showing the structure of the limiter 200 according to a first embodiment of the invention and FIG. 3 is a chart for explaining an operation thereof. Although the limiter 200 will be described to be used in the electric motor driving device in FIG. 1, it is not restricted thereto but can be widely used as a voltage or current limiting circuit in a general electric circuit.

In FIG. 2, an input signal Va (corresponding to the error output signal in FIG. 1) is sent to an excess signal circuit 40 and a signal output circuit 60. On the other hand, a limitation signal Vlim generated in a limitation signal circuit 20 is input to the excess signal circuit 40.

The excess signal circuit 40 compares the input signal Va with the limitation signal Vlim. When the input signal Va is smaller than the limitation signal Vlim, an excess signal Vext is zero. When the input signal Va is larger than the limitation signal Vlim, an excess (Va−Vlim) is output as the excess signal Vext.

The signal output circuit 60 receives the input signal Va and the excess signal Vext, and subtracts the excess signal Vext from the input signal Va and sends an output signal Vo.

The operation of the limiter 200 in FIG. 2 will also be described with reference to FIGS. 3(a) and 3(b). For a period (to t1, t2 to t3, and t4 to) in which the input signal Va is smaller than the limitation signal Vlim, the excess signal Vext is zero. Accordingly, the output signal Vo is equal to the input signal Va.

For a period (t1 to t2 and t3 to t4) in which the input signal Va is larger than the limitation signal Vlim, next, the excess signal Vext corresponds to the excess (Va−Vlim). The signal output circuit 60 subtracts the excess signal Vext from the input signal Va. Therefore, the output signal Vo is obtained by Va−(Va−Vlim) and a limitation to the limitation signal Vlim can always be carried out with high precision.

Figure 4:
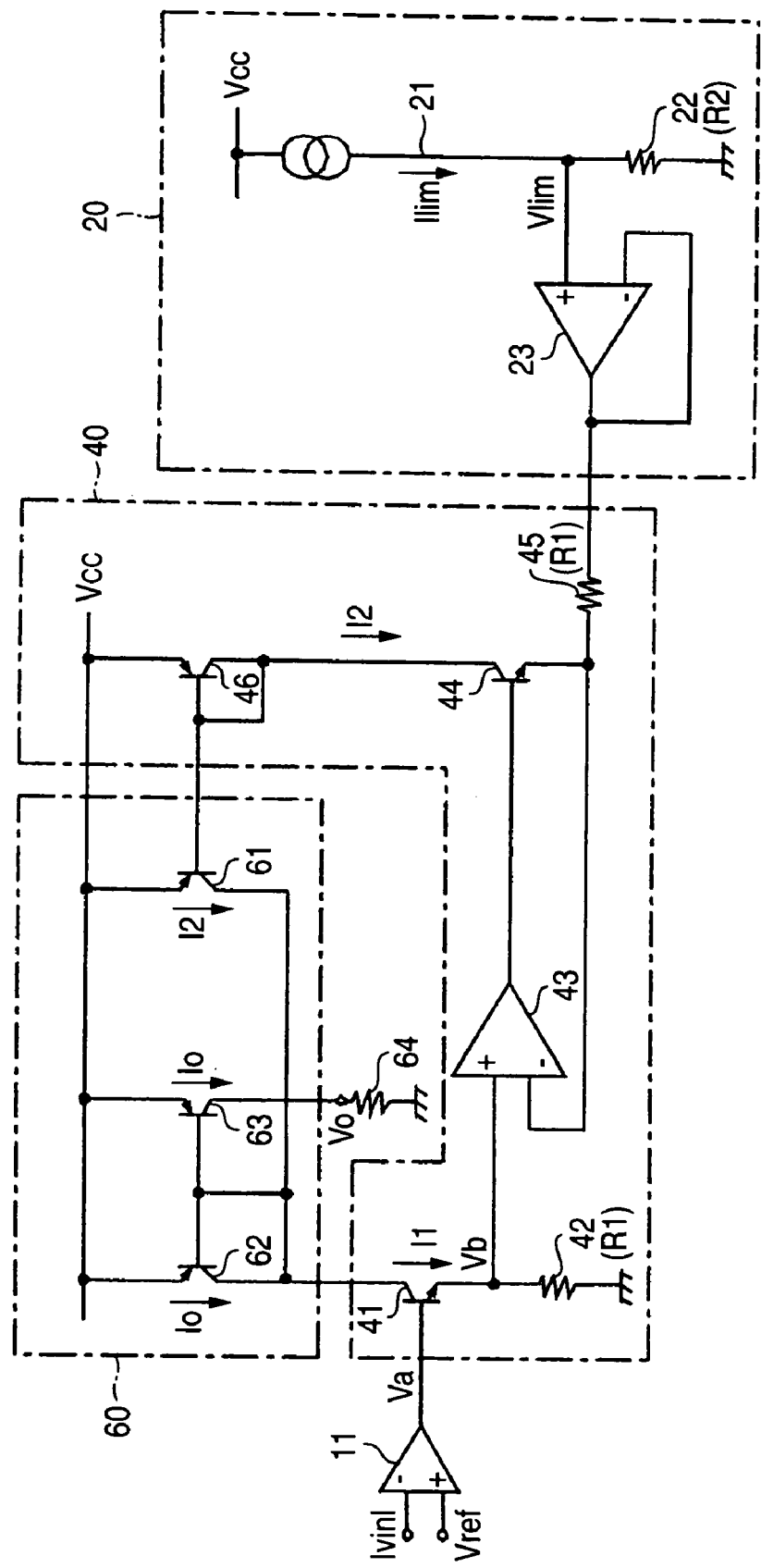
FIG. 4 is a circuit diagram showing a specific example of the limiting circuit according to the invention.
Figure 5:
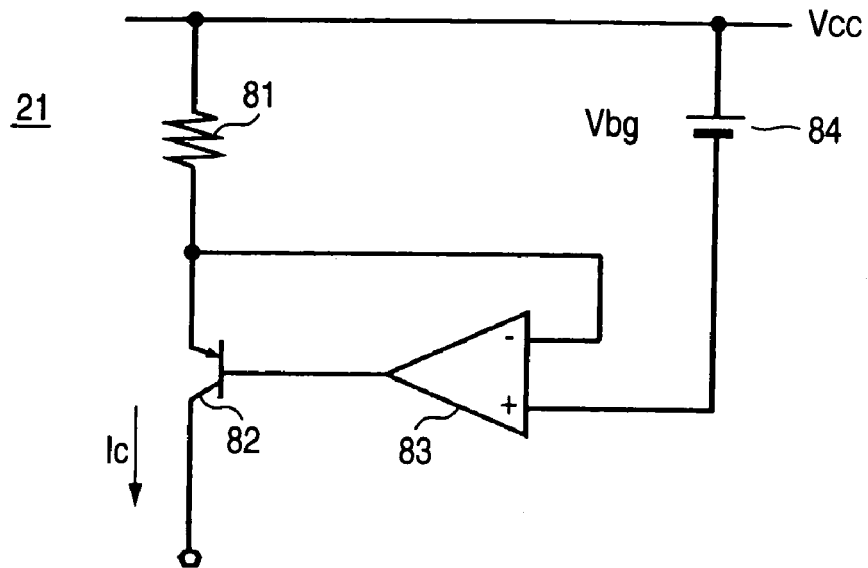
FIG. 5 is a diagram showing an example of the circuit structure of a constant current source to be used in the limiting circuit.
Figure 6:
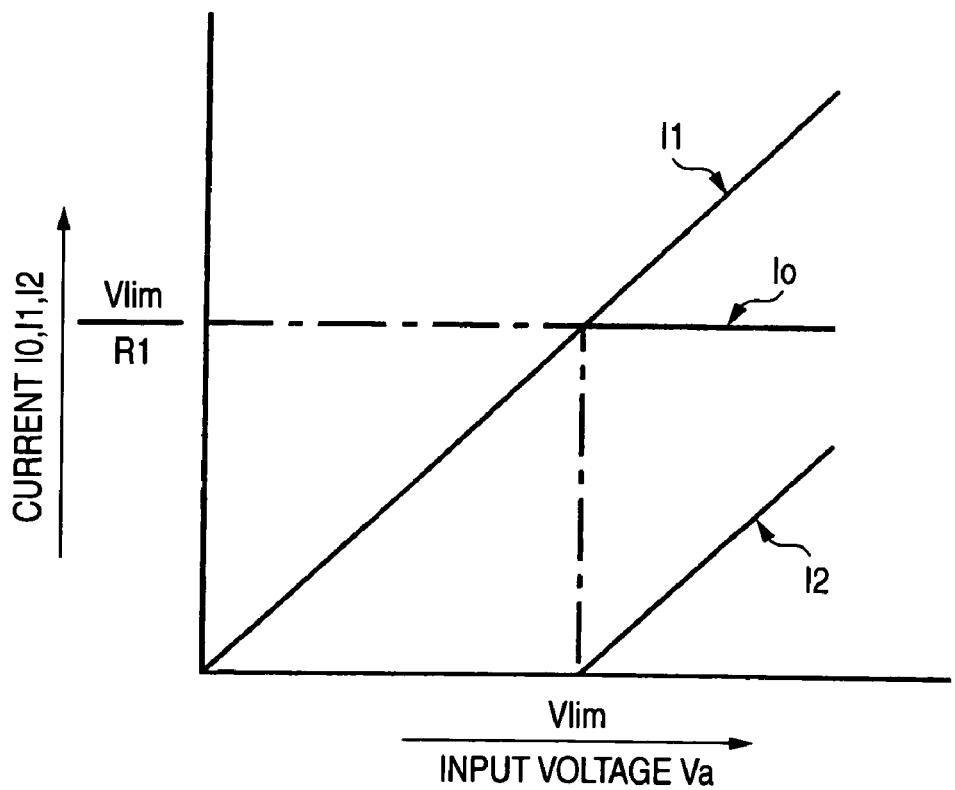
FIG. 6 is a chart showing the operation characteristic of the limiting circuit in FIG. 4.

FIG. 4 is a diagram showing a second embodiment of the limiter according to the invention, illustrating a specific example of the limiter 200 shown in FIG. 2. These components are fabricated in the same IC. FIG. 5 is a diagram showing an example of the circuit structure of a constant current source to be used in the limiter 200. Moreover, FIG. 6 is a chart showing the operation characteristic of a limiting circuit in FIG. 4.

In FIG. 4, an error amplifier 11 is the same as the error amplifier 110 in FIG. 1, and an error output signal thereof is an input signal (input voltage) Va.

In a limitation signal circuit 20, a constant current source 21 and a resistor 22 are connected in series between a power voltage Vcc and a ground. The constant current source 21 causes a constant current Ilim to flow and the resistor 22 has a resistance value R2. A voltage Vlim on a serial node is input as a reference voltage to the non-inverting input terminal (+) of a voltage follower connected buffer 23. Therefore, an output has the voltage Vlim and a low impedance. Each voltage is based on a ground potential if there is no particular restriction in the invention.

FIG. 5 shows an example of the structure of the constant current source 21. In FIG. 5, a voltage source 84 is a constant voltage source having a constant voltage Vbg constituted by a band gap type constant voltage circuit and is connected between a power voltage Vcc and the non-inverting input terminal (+) of an operational amplifier 83. Moreover, a resistor 81 and a PNP type transistor (hereinafter referred to as a PNP) 82 are connected in series between the power voltage Vcc and a constant current output end. A serial node is connected to the inverting input terminal (−) of the operational amplifier 83 and the output end of the operational amplifier 83 is connected to the base of the PNP 82. Consequently, a constant current Ic (that is, Ilim) is output.

In the constant current source 21, the constant voltage Vbg is obtained by the band gap type constant voltage circuit and is therefore stable. Since the resistor 81 is provided in the same IC and is formed by the same material in the same manufacturing process as the resistor 22 of the limitation signal circuit 20, moreover, a temperature characteristic thereof is also identical. The resistor 81 has a so-called pair property. Even if manufacture has a variation or an ambient temperature is changed, accordingly, the limitation reference voltage Vlim is rarely changed and is maintained to have a constant value.

Turning back to FIG. 4 again, in the excess signal circuit 40, an NPN type transistor (hereinafter referred to as an NPN) 41 having a base terminal, to which the input voltage Va is applied, and a resistor 42 (a resistance value R1) are connected in series where a first current I1 corresponding to the input voltage Va flows. A voltage Vb on a serial node, that is, a dropped voltage in the resistor 42 is input to the non-inverting input terminal (+) of an operational amplifier 43. The inverting input terminal (−) of the operational amplifier 43 is connected to the output end of the buffer 23 through a resistor 45 (a resistance value R1).

An NPN 44 and a PNP 46 are connected in series between the inverting input terminal (−) of the operational amplifier 43 and the power voltage Vcc. The NPN 44 has a base connected to the output end of the operational amplifier 43 and an emitter connected to the inverting input terminal (−) of the operational amplifier 43. The PNP 46 has a base and a collector connected to each other and an emitter connected to the power voltage Vcc. When the input voltage Va, strictly, the serial node voltage Vb obtained by subtracting a base-emitter voltage Vbe of the PNP 41 is higher than the limitation reference voltage Vlim, consequently, a second current I2, which is proportional to the excess, flows through the NPN 44, the PNP 46 and the resistor 45.

In the signal output circuit 60, a PNP 61 and a PNP 62 are connected in parallel between the power voltage Vcc and the collector of the NPN 41. The base of the PNP 61 is connected to that of the PNP 46 to form a so-called current mirror structure. Therefore, in case of the sizes of the transistors being equal to each other, the second current I2 flows to the PNP 61.

Moreover, a third current Io (=I1−I2) obtained by subtracting the second current I2 from the first current I1 flows to the PNP 62. The PNP 62 has a base and a collector connected to each other, and the base of a PNP 63 having the same size as that of the PNP 62 is connected to that of the PNP 62 so that a current mirror structure is obtained. Accordingly, the third current Io flows as an output current Io to the PNP 63. The output current Io may be exactly utilized or a resistor 64 may be connected to convert the output current Io into an output voltage Vo for use as shown in the drawing.

In this drawing, the transistors and the resistors have the same type and are formed by the same material in the same manufacturing process, and have arrangements which take a pair property into consideration. Consequently, a relative error becomes extremely small against a change in a temperature and a variation in manufacture. Accordingly, each current and each voltage can be kept precisely without being deviated from the predetermined values. This tendency is the same as those in other embodiments.

The operation of the limiting circuit in FIG. 4 will be described with reference to the characteristic chart of FIG. 6. When the input voltage Va is supplied to the base of the NPN 41, the first current I1 corresponding to the input voltage Va flows to the NPN 41 and the resistor 42. The first current I1 also flows to the PNP 61 and the PNP 62.

Since the first current I1 is influenced by the base-emitter voltage Vbe of the NPN 41, it is accurately expressed in the following manner.

$$I1=(Va-Vbe)/R1 \quad (1)$$

While the input voltage Va is lower than the limitation reference voltage Vlim to carry out a limitation, the operational amplifier 43 sends a negative output and the NPN 44 is OFF. In this state, accordingly, the second current I2 becomes zero so that the output current Io is equal to the first current I1. More specifically, the output current Io (that is, the output voltage Vo), which is proportional to the input voltage Va, is ouput.

When the input voltage Va is higher than the limitation reference voltage Vlim to carry out a limitation, the degree of conduction of the NPN 44 is controlled so that the second current I2 flows through the PNP 46, the NPN 44 and the resistor 45. A voltage drop I2×R1 of the resistor 45 is added to the limitation reference voltage Vlim and a voltage thus obtained is supplied to the inverting input terminal (−) of the operational amplifier 43. The operational amplifier 43 controls the degree of conduction of the NPN 44, that is, the second current I2 in order to eliminate a difference between two inputs.

The second current I2 is expressed in the following manner.

$$I2 \times R1 + Vlim = Vb$$

$$I2=(Vb-Vlim)/R1 \quad (2)$$

The second current I2 also flows to the PNP 61 which is current mirror connected to the PNP 46. Accordingly, the third current Io (=I1−I2) obtained by subtracting the second current I2 from the first current I1 flows to the PNP 62. The PNP 63 causing an output current to flow is current mirror connected to the PNP 62. Therefore, an output current Io which is equal to the third current Io is output.

The output current Io is expressed in the following manner from the equations (1) and (2).

$$Io = I1 - I2 = \{(Va-Vbe)/R1\} - \{(Vb-Vlim)/R1\}$$
$$= \{Va-(Vbe+Vb)+Vlim\}/R1$$

Since Va=(Vbe+Vb) is always set, there is obtained
$$Io=Vlim/R1 \quad (3)$$

Thus, the output current Io is not related to the base-emitter voltage Vbe of the NPN 41. Even if the voltage Vbe fluctuates by the influence of the input voltage Va or a temperature, therefore, the output current Io is limited to have a constant value determined by the limitation reference voltage Vlim and the resistance value R1.

Figure 7:
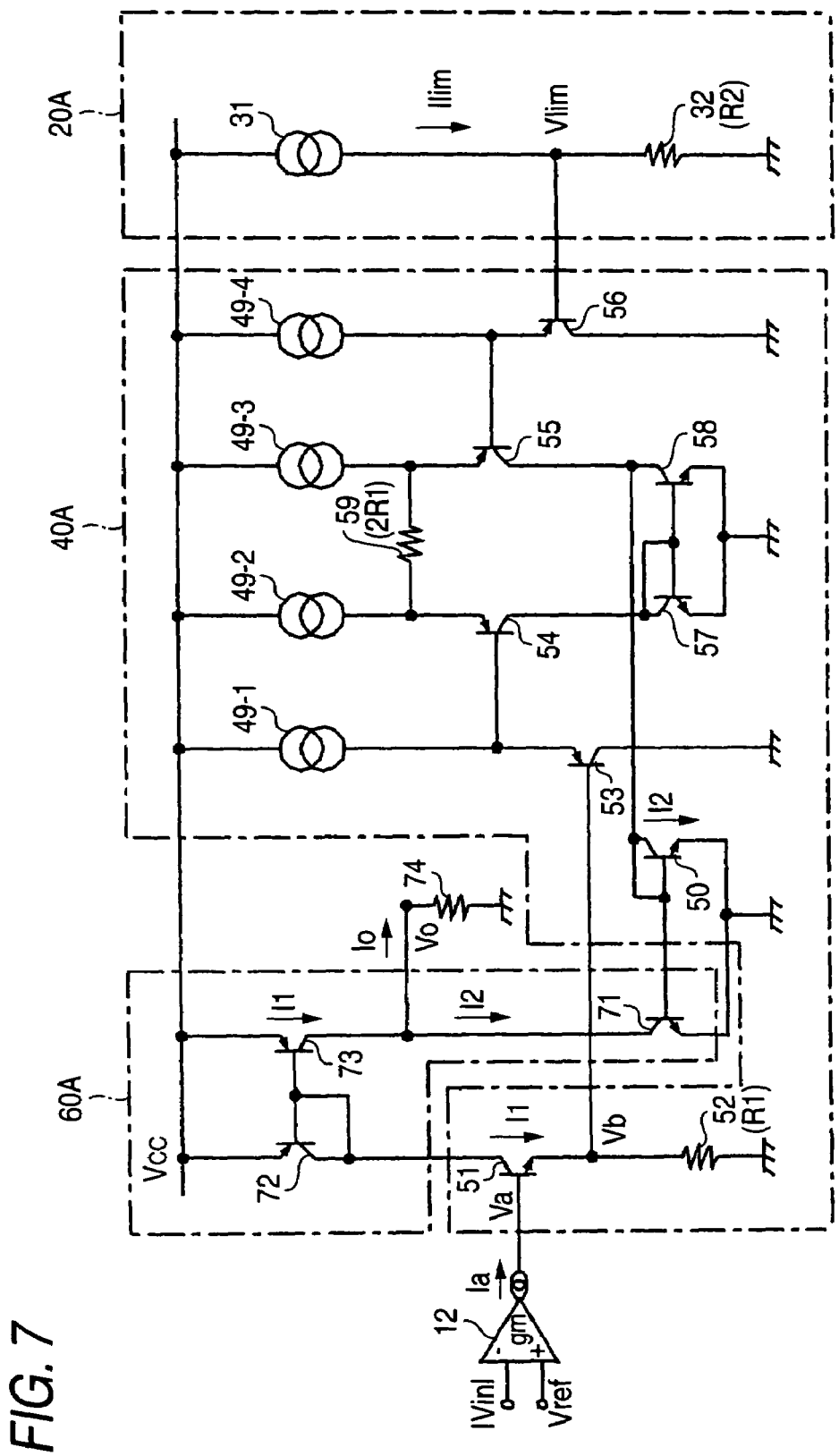
FIG. 7 is a circuit diagram showing another specific example of the limiting circuit according to the invention.
Figure 8:
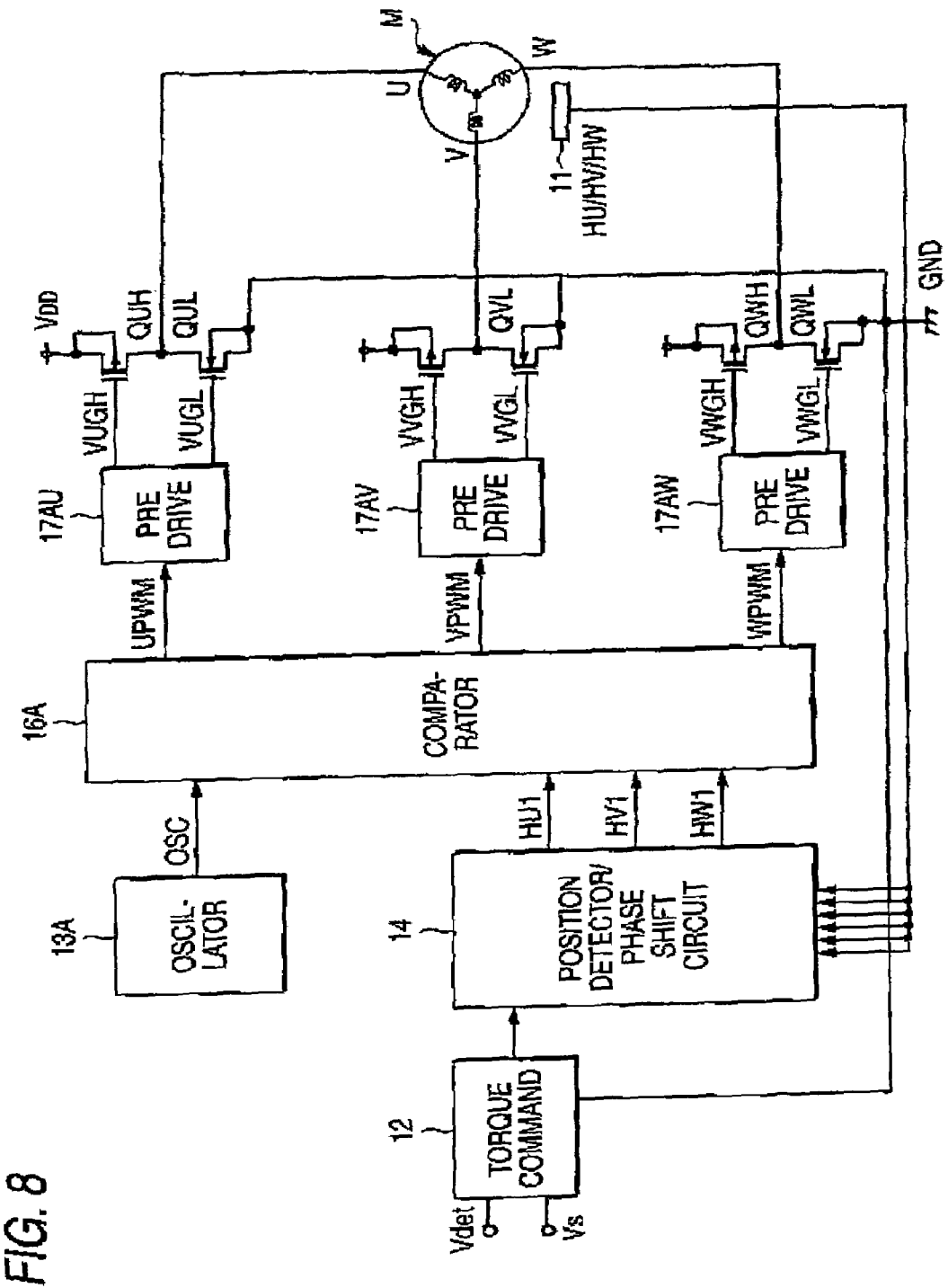
FIG. 8 is a diagram showing the structure of a conventional driving device for a three-phase brushless electric motor.

FIG. 7 shows a third embodiment of the limiter according to the invention, illustrating another specific example of the limiter 200 shown in FIG. 2. These components are fabricated in the same IC.

In FIG. 7, an error amplifier 12 corresponds to the error amplifier 110 in FIG. 1, and has a mutual conductance gm and outputs an input current Ia corresponding to a difference between a reference voltage Vref and a detection voltage |Vin| in this example. The error amplifier 12 can also be applied to the embodiment in FIG. 4. To the contrary, moreover, the error amplifier 11 in FIG. 4 can also be applied to the embodiment in FIG. 7. In other words, both of FIGS. 4 and 7 can be applied to a voltage input type and a current input type.

In a limitation signal circuit 20A, a constant current source 31 and a resistor 32 are connected in series between a power voltage Vcc and a ground. The constant current source 31 causes a constant current Ilim to flow and the resistor 32 has a resistance value R2. A voltage Vlim on a serial node is a limitation reference voltage.

The constant current source 31 is the same as that shown in FIG. 5. Moreover, the constant current source shown in FIG. 5 is also utilized for another constant current source used in the invention if necessary.

In an excess signal circuit 40A, an input current Ia is supplied from the base of an NPN 51 to a resistor 52 (a resistance value R1). Then, a first current I1 corresponding to a current amplification factor hfe of the NPN 51 flows to a serial connecting circuit of the NPN 51 and the resistor 52. As a result, a voltage Va of the base of the NPN 51 is generated.

A voltage Vb on the serial node of the NPN 51 and the resistor 52, that is, a dropped voltage in the resistor 52 is a comparison voltage of a differential amplifying circuit.

As shown in the drawing, the differential amplifying circuit is provided with a series circuit of a constant current source 49-1 and a PNP 53, a series circuit of a constant current source 49-2, a PNP 54 and an NPN 57, a series circuit of a constant current source 49-3, a PNP 55 and an NPN 58, and a series circuit of a constant current source 49-4 and a PNP 56 between the power voltage Vcc and the ground, respectively. The constant current sources 49-1 and 49-4 may have the same current value, and furthermore, the constant current sources 49-2 and 49-3 may have the same current value.

The comparison voltage Vb is supplied to the base of the PNP 53, and the emitter of the PNP 53 is connected to the base of the PNP 54. The limitation reference voltage Vlim is supplied to the base of the PNP 56, and the emitter of the PNP 56 is connected to the base of the PNP 55. The collector and the base of the NPN 57 are connected to each other, and the base of the NPN 57 is connected to the base of the NPN 58 so that a current mirror structure is obtained. The emitter of the NPN 57 and that of the NPN 58 are connected to the ground.

Furthermore, a resistor 59 (a resistance value 2R1) is connected between the emitter of the PNP 54 and that of the PNP 55. An NPN 50 is connected in parallel with the NPN 58, and the collector and the base of the NPN 50 are connected to the collector of the NPN 58. When the comparison voltage Vb is higher than the limitation reference voltage Vlim, consequently, a second current I2 which is proportional to the excess flows through the NPN 50.

In a signal output circuit 60A, a PNP 72 is connected between the power voltage Vcc and the collector of the NPN 51, and a base and a collector thereof are connected to each other. Moreover, a PNP 73 and an NPN 71 which have the same magnitudes as those of the PNP 72 and the NPN 50 are provided in series between the power voltage Vcc and the ground.

The base of the PNP 73 is connected to that of the PNP 72, thereby constituting a current mirror circuit. Moreover, the base of the NPN 71 is connected to that of the NPN 50, thereby constituting the current mirror circuit. An output current Io is led from the node of the PNP 73 and the NPN 71.

The same first current I1 as that of the PNP 72 flows to the PNP 73, while the same second current I2 as that of the NPN 50 flows to the NPN 71. Accordingly, a difference current (I1−I2) between the first current I1 and the second current I2 flows as an output current Io. The output current Io may be exactly utilized or may be converted into an output voltage Vo with a connection of a resistor 74 for use as shown in the drawing.

The operation of a limiting circuit in FIG. 7 will be described. When the input current Ia is supplied to the base of the NPN 51, the first current I1 corresponding to the input current Ia flows to the PNP 72, the NPN 51 and the resistor 52. The first current I1 also flows to the PNP 73. The comparison voltage Vb is obtained by Vb=I1×R1.

While the input current Ia is smaller than the limitation reference voltage Vlim to carry out a limitation, the second current I2 is zero. Therefore, the output current Io is equal to the first current I1. More specifically, the output current Io which is proportional to the input current Ia (that is, the output voltage Vo) is output.

When the input current Ia is larger than the limitation reference voltage Vlim to carry out a limitation, the second current I2 flows to the NPN 50. Accordingly, the second current I2 flows to the NPN 71. At this time, for easy understanding, it is assumed that the comparison voltage Vb is applied to the base of the PNP 54 and the limitation reference voltage Vlim is applied to the base of the PNP 55, and a base-emitter voltage between the PNPs 54 and 55 is disregarded for simplification. In this case, the following voltage is applied to the resistor 59.

$$Vb-Vlim=2R1\times(I2/2)=R1\times I2 \quad (4)$$

Accordingly, the second current I2 flowing to the NPN 71 is obtained as follows.

$$I2=(Vb-Vlim)/R1 \quad (5)$$

The comparison voltage Vb is proportional to the input current Ia. When the input current Ia exceeds a predetermined value, accordingly, the second current I2 starts to flow and a magnitude thereof is proportional to a part exceeding a predetermined value.

Consequently, the output current Io (=I1−I2) obtained by subtracting the second current I2 from the first current I1 flows to the output. The output current Io is not related to the base-emitter voltage Vbe of the NPN 51 but is limited to have a constant value determined by the limitation reference voltage Vlim and the resistance value R1.

[Advantage of the Invention]

According to the invention, an input signal can be limited and output with high precision on the level of a limitation signal.

Moreover, the transistor and the resistor in the limiting circuit have such structures as to take a pair property into consideration. By fabricating them in an integrated circuit, therefore, it is possible to maintain high precision for a change in a temperature or a variation in manufacture.

By the electric motor driving device according to the invention, moreover, it is possible to limit an error output signal with high precision by a permitted limitation value. Accordingly, a sine wave-shaped driving current can be supplied to the electric motor. Thus, the electric motor can be operated efficiently in a silent condition.

What is claimed is:

1. A limiting circuit comprising:
   an excess signal circuit for inputting an input signal and a limitation signal, and comparing them with each other so as to output an excess amount thereof as an excess signal when the input signal exceeds the limitation signal; and
   a signal output circuit for inputting the input signal and the excess signal, subtracting the excess signal from the input signal of which subtracted amount is output as an output signal.

2. The limiting circuit according to claim 1, further comprising a limitation signal circuit having such a structure that a constant current source and a resistor are connected in series and a voltage on a serial node is fetched as the limitation signal through a buffer.

3. The limiting circuit according to claim 2, wherein the excess signal circuit has such a structure that a transistor to which the input signal is supplied as a control signal and a resistor are connected in series, a first current corresponding to the input signal flows, a voltage on a node of the transistor and the resistor is set to be a comparison voltage, and a second current corresponding to an excess flows when the comparison voltage exceeds an output voltage of the buffer, and
   the signal output circuit outputs, as the output signal, a third current corresponding to a difference between the first current and the second current.

4. The limiting circuit according to claim 1, further comprising a limitation signal circuit having such a structure that a constant current source and a resistor are connected in series and a voltage on a serial node is fetched as the limitation signal.

5. The limiting circuit according to claim 4, wherein the excess signal circuit has such a structure that a transistor to which the input signal is supplied as a control signal and a resistor are connected in series, a first current corresponding to the input signal flows, a voltage on a node of the transistor and the resistor is set to be a comparison voltage and is differentially amplified with the limitation signal, and a second current corresponding to an excess flows when the comparison voltage exceeds the limitation signal, and the signal output circuit outputs, as the output signal, a third current corresponding to a difference between the first current and the second current.

6. An electric motor driving device comprising:

an error amplifier for generating an error output signal depending on a difference between a reference signal and a current detection signal corresponding to a current flowing to an electric motor;

a limiting circuit for inputting the error output signal, limiting a value to be a predetermined value, and outputting a limitation error output signal; and a driving circuit for PWM driving the electric motor based on the limitation error output signal and a signal corresponding to a sine wave-shaped rotating position signal of the electric motor, wherein the driving circuit has a multiplier for multiplying the limitation error output signal by the sine wave-shaped rotating position signal of the electric motor and outputting a PWM command signal, a PWM converting block for forming a PWM control signal based on the PWM command signal, and a driving stage block for outputting an electric motor driving current based on the PWM control signal.

7. An electric motor driving device comprising:

an error amplifier for generating an error output signal depending on a difference between a reference signal and a current detection signal corresponding to a current flowing to an electric motor;

a limiting circuit for inputting the error output signal, limiting a value to be a predetermined value, and outputting a limitation error output signal; and a driving circuit for PWM driving the electric motor based on the limitation error output signal and a signal corresponding to a sine wave-shaped rotating position signal of the electric motor, wherein the limiting circuit comprises:

an excess signal circuit for inputting an input signal and a limitation signal, and comparing them with each other so as to output an excess amount thereof as an excess signal when the input signal exceeds the limitation signal; and a signal output circuit for inputting the input signal and the excess signal, subtracting the excess signal from the input signal of which subtracted amount is output as an output signal.

* * * * *